(12) United States Patent
Uzoh

(10) Patent No.: US 9,551,083 B2
(45) Date of Patent: Jan. 24, 2017

(54) PADDLE FOR MATERIALS PROCESSING

(71) Applicant: Invensas Corporation, San Jose, CA (US)

(72) Inventor: Cyprian Emeka Uzoh, San Jose, CA (US)

(73) Assignee: Invensas Corporation, San Jose, CA (US)

( * ) Notice: Subject to any disclaimer, the term of this patent is extended or adjusted under 35 U.S.C. 154(b) by 176 days.

(21) Appl. No.: 14/482,981

(22) Filed: Sep. 10, 2014

(65) Prior Publication Data

US 2016/0068988 A1   Mar. 10, 2016

(51) Int. Cl.
*C25D 17/00*   (2006.01)
*C25D 21/10*   (2006.01)
*C25D 7/12*   (2006.01)
*C25D 5/08*   (2006.01)

(52) U.S. Cl.
CPC ............... *C25D 21/10* (2013.01); *C25D 5/08* (2013.01); *C25D 7/12* (2013.01); *C25D 17/001* (2013.01)

(58) Field of Classification Search
CPC ........... C25D 7/12–7/123; C25D 17/02; C25D 21/10; C25C 7/00; C25B 9/00–9/206; C25B 15/00; C25B 15/08
USPC ........................................ 204/279, 261, 273
See application file for complete search history.

(56) References Cited

U.S. PATENT DOCUMENTS

| | | | |
|---|---|---|---|
| 5,516,412 A | 5/1996 | Andricacos et al. | |
| 6,103,096 A | 8/2000 | Datta et al. | |
| 2014/0251797 A1* | 9/2014 | Herkle | C25F 7/02 204/273 |

OTHER PUBLICATIONS

Beaudry et al., "Faraday in the Fab: A Look at Copper Plating Equipment for On-Chip Wiring," The Electrochemical Society Interface, Winter 2004, pp. 40-44.

* cited by examiner

*Primary Examiner* — Luan Van
*Assistant Examiner* — Alexander W Keeling

(57) ABSTRACT

A paddle for a plating system has a housing with a back portion, a front portion, a first side portion, a second side portion, a first end portion, and a second end portion. A first fin is disposed laterally along a first external surface of the first side portion and offset and coupled to the first external surface to define a first passageway between the first external surface of the first side portion and a first internal surface of the first fin for flow of the electrolyte through the first passageway. A second fin is disposed laterally along a second external surface of the second side portion and offset and coupled to the second external surface to define a second passageway between the second external surface of the second side portion and a second internal surface of the second fin for flow of the electrolyte through the second passageway.

18 Claims, 15 Drawing Sheets

PADDLE FOR MATERIALS PROCESSING

FIELD

The following description relates to a paddle for materials processing. More particularly, the following description relates to a paddle for electro-chemical processing of materials for formation of an IC.

BACKGROUND

Electroplating is a process used for depositing a thin film. Conventionally, the thin film is of a metal or alloy, and the workpiece on which the thin film is deposited is a semiconductor wafer. In electroplating, it is conventionally desirable to deposit a thin film with generally uniform thickness and uniform composition. Moreover, control of the thickness of such thin film deposition is conventionally desirable. For one or more of these goals for electroplating, agitation of an electrolyte in a tank is useful. Additionally, a vertically oriented paddle has been used, such as in U.S. Pat. No. 5,516,412, so debris and other detritus of an electroplating process falls to the bottom of a tank to avoid deposition on a workpiece.

Accordingly, it would be desirable and useful to provide a paddle that may be used in electroplating that facilitates movement toward achieving one or more of the above-mentioned goals associated with electroplating.

BRIEF SUMMARY

An apparatus relates generally to a paddle for an electro-chemical plating system. In such an apparatus, there is housing. The housing has a back portion and a front portion spaced apart from one another. The housing has a first side portion and a second side portion spaced apart from one another. The housing has a first end portion and a second end portion spaced apart from one another. A first fin is disposed laterally along a first external surface of the first side portion and offset and coupled to the first external surface to define a first passageway between the first external surface of the first side portion and a first internal surface of the first fin for flow of the electrolyte through the first passageway. A second fin is disposed laterally along a second external surface of the second side portion and offset and coupled to the second external surface to define a second passageway between the second external surface of the second side portion and a second internal surface of the second fin for flow of the electrolyte through the second passageway.

An apparatus relates generally to another paddle for an electrochemical plating system. In such an apparatus, there is a housing. The housing has a back portion and a front portion spaced apart from one another. The back portion has a first opening of a channel through the housing for inflow of an electrolyte. The front portion has a second opening of the channel for outflow of the electrolyte. The housing has a first side portion and a second side portion spaced apart from one another. The housing has a first end portion and a second end portion spaced apart from one another. The back portion, the front portion, the first side portion, the second side portion, the first end portion, and the second end portion define a hollow region of the housing.

An apparatus relates generally to yet another paddle for an electrochemical plating system. In such an apparatus, there is a housing. The housing has a back portion and a front portion spaced apart from one another. The back portion has first openings for inflow of an electrolyte. The front portion has second openings for outflow of the electrolyte. The housing has a first side portion and a second side portion spaced apart from one another. The housing has a first end portion and a second end portion spaced apart from one another. The back portion, the front portion, the first side portion, the second side portion, the first end portion, and the second end portion define a hollow region of the housing. A first fin is disposed laterally along a first external surface of the first side portion and offset and coupled to the first external surface to define a first passageway between the first external surface of the first side portion and a first internal surface of the first fin for flow of the electrolyte through the first passageway. A second fin is disposed laterally along a second external surface of the second side portion and offset and coupled to the second external surface to define a second passageway between the second external surface of the second side portion and a second internal surface of the second fin for flow of the electrolyte through the second passageway.

BRIEF DESCRIPTION OF THE DRAWING(S)

Accompanying drawing(s) show exemplary embodiment(s) in accordance with one or more aspects of exemplary apparatus(es) or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Figure 1:
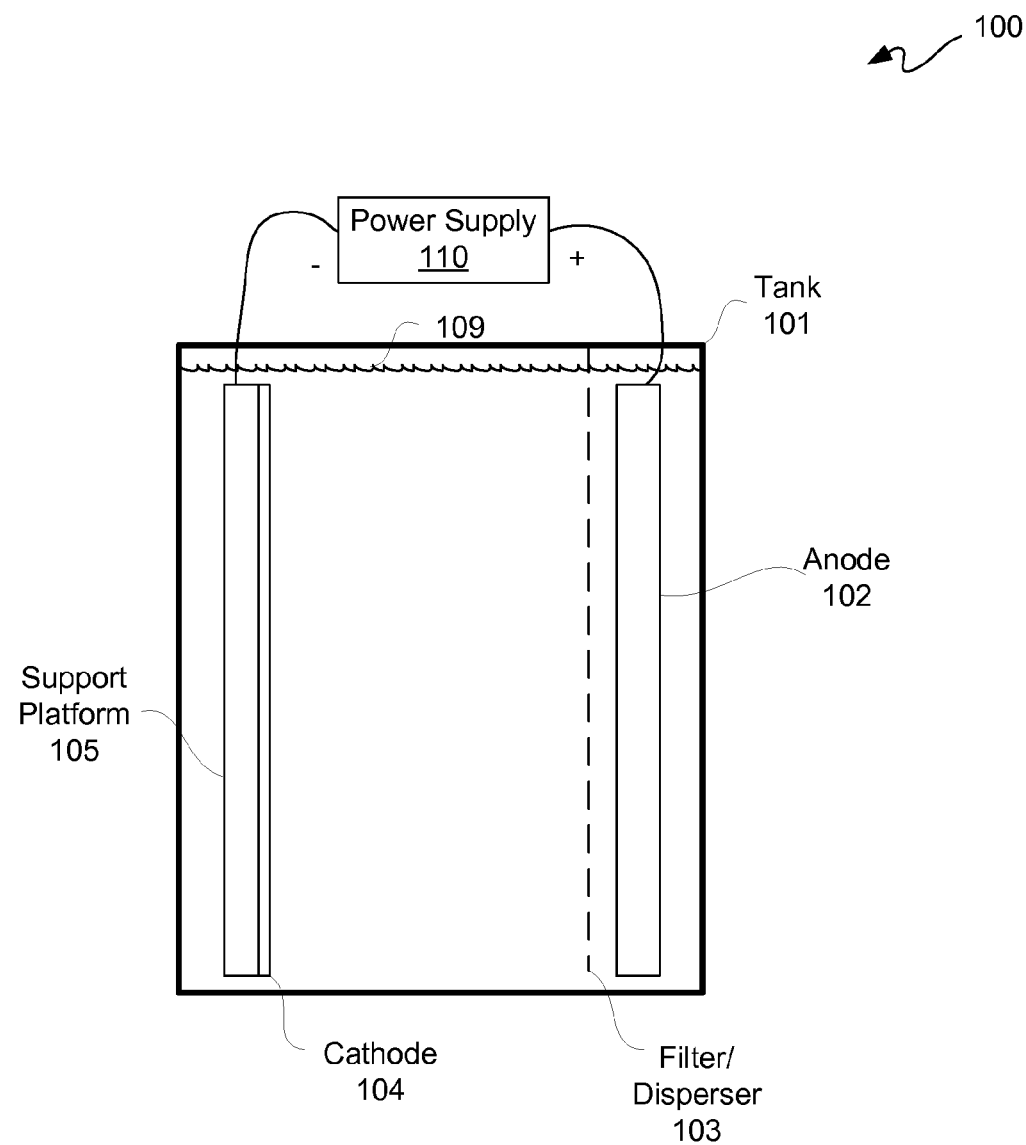
FIG. 1 is a block diagram depicting an exemplary conventional tank plating cell.

FIG. 1 is a block diagram depicting an exemplary conventional tank plating cell 100. Tank plating cell 100 includes a tank 101, an anode 102, a filter/disperser 103, a cathode 104, a support platform 105, a power supply 110, and an electrolytic fluid ("electrolyte") 109. A positive terminal of power supply 110 is wired to anode 102, and a negative terminal of power supply 110 is wired to support platform 105. Support platform 105 is attached to cathode 104. Anode 102, cathode 104, and support platform 105 may have a vertical orientation and be located inside tank 101. Electrolyte 109 may be used to sufficiently fill tank 101 for purposes of electroplating or electroetching or electropolishing or a combination thereof. Anode 102, cathode 104, and support platform 105 may be immersed in electrolyte 109 to complete a conductive path from anode 102 to cathode 104, as known.

Electrolyte 109 may include a metal or alloy for purposes of plating. For example, a metal layer may be electrolyticly plated onto a surface of a workpiece. Along those lines, a metal deposition may include immersion bath plating, electroplating, or a combination of electroplating and immersion bath plating. Thus, a metal layer may be deposited to partially fill or fill an opening and/or coat a surface of a workpiece. One or more conductive metals may be used to sequentially coat a workpiece from metal plating operations. In other implementations, a metal layer may be an alloy. In some instances, composition of plated metal layer may vary in thickness. Examples of materials that may be used for a plated metal layer include without limitation palladium, gold, copper, tin, tin-copper, and tin-solder alloy, among others.

Figure 2:
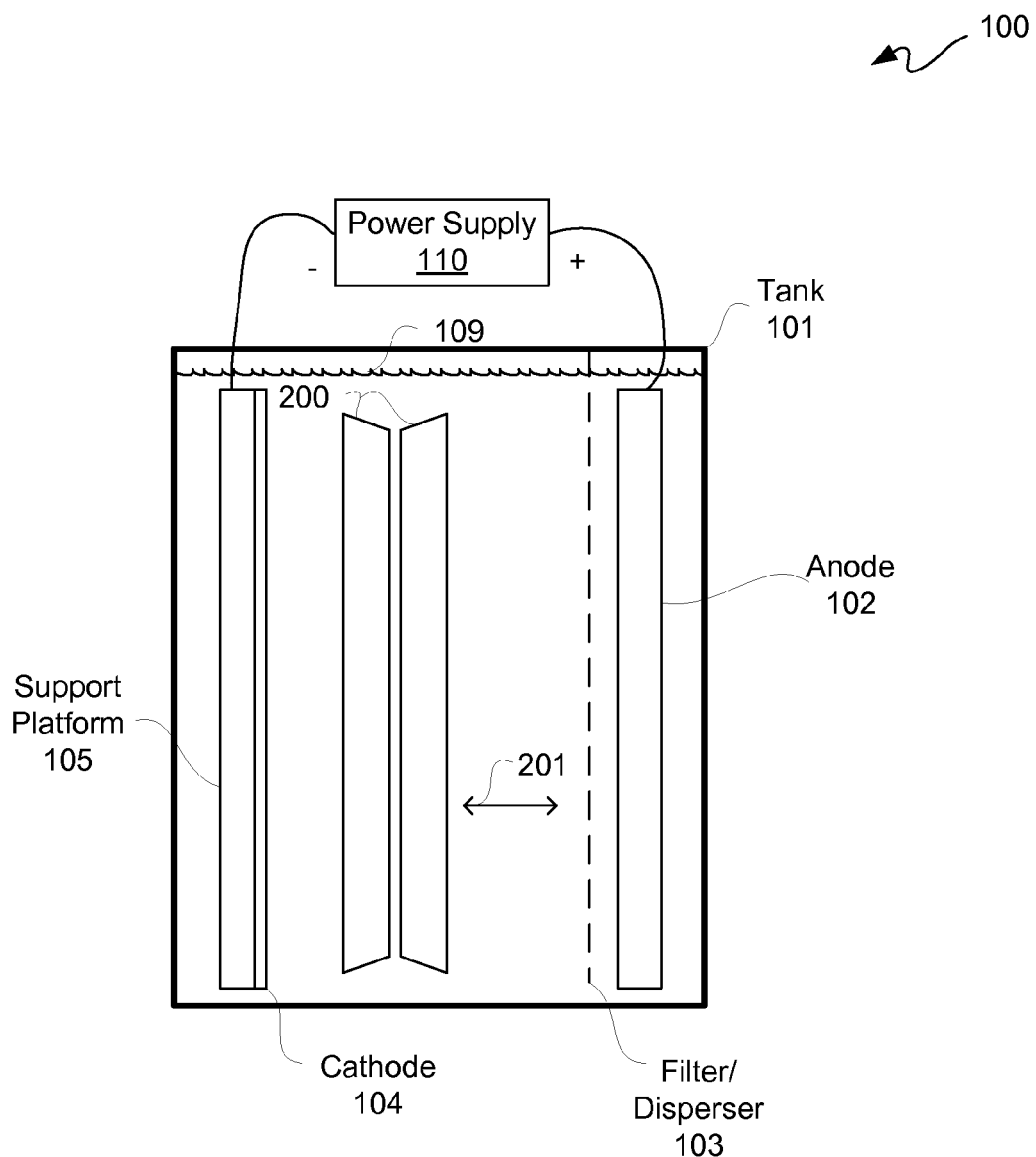
FIG. 2 is the block diagram of FIG. 1 depicting an exemplary conventional tank plating cell with a conventional vertical paddle.

Unfortunately, tank plating cell 100 has substantially limited agitation or poor mass transport and/or non-uniform agitation for deposition of an electrolytic material. FIG. 2 is the block diagram of FIG. 1 depicting an exemplary conventional tank plating cell 100 with a conventional vertical paddle 200. Vertical paddle 200 is moved left to right to left in a cyclic manner, as generally indicated by arrow 201. The frequency of motion of paddle 200 across the cathode 104 may vary between approximately 0.1 to 2 Hz in an implementation, and generally may be between approximately 0.4 to 1.2 Hz in some instances. An example of a vertical paddle 200 may be found in U.S. Pat. No. 5,516,412.

Figure 3:
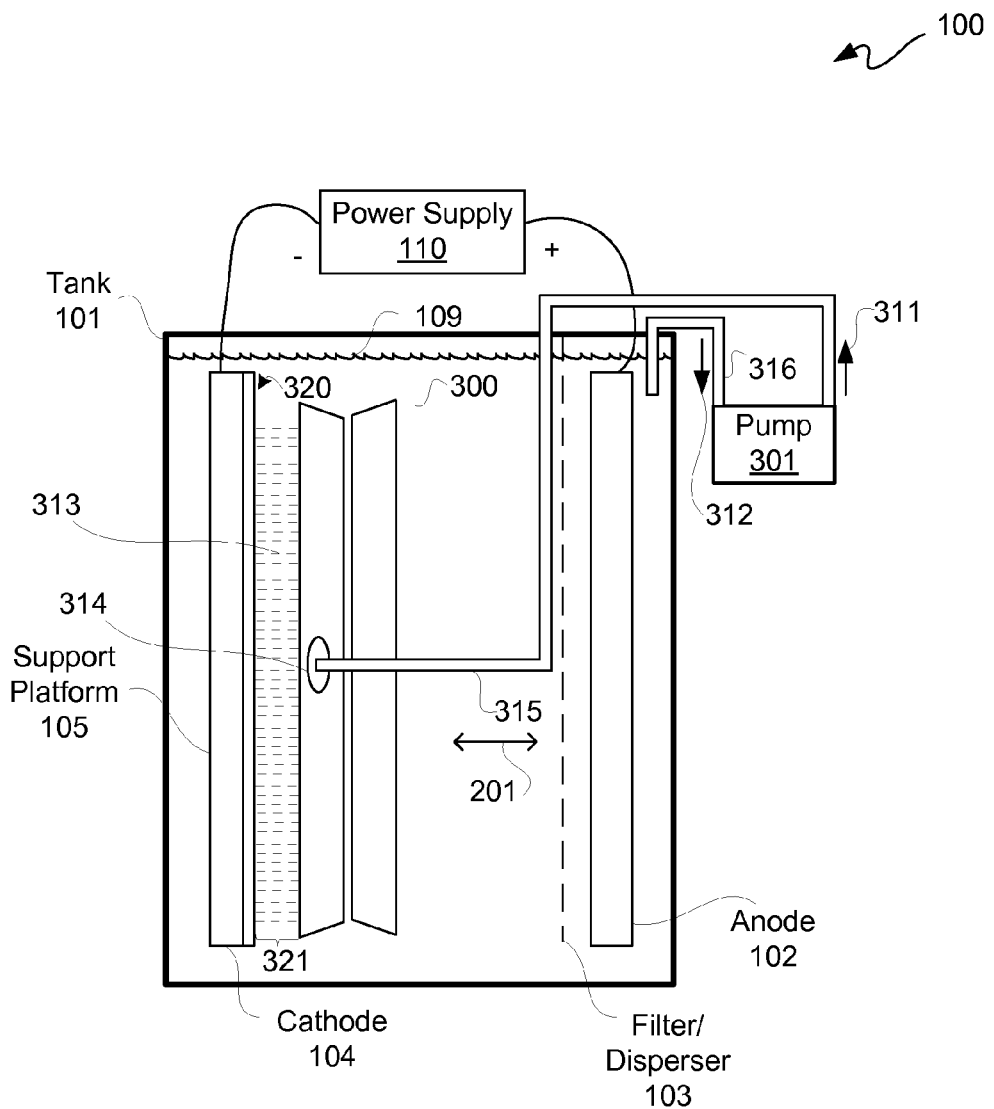
FIG. 3 is the block diagram of FIG. 2 depicting an exemplary conventional tank plating cell with a modified vertical paddle.

FIG. 3 is the block diagram of FIG. 2 depicting an exemplary conventional tank plating cell 100 with a modified vertical paddle 300. Modified vertical paddle 300 is a modification to a conventional vertical paddle 200, namely an orifice 314 is defined by a vertical paddle 300 along with an in-feed tube 315. In-feed tube 315 may have an outlet opening disposed to allow electrolyte 109 to flow out of an orifice 314 to provide an electrolyte stream 313 for impinging upon a surface 320 of a workpiece, which may be cathode 104 and paddle 300 oscillates across such cathode or workpiece. In-feed tube 315 may be coupled to an outlet port 311 of a pump 301. An inlet port 312 of pump 301 may be coupled to an out-feed tube 316. An intake or inlet opening of out-feed tube 316 may be disposed in tank 101 or a remote reservoir (not shown) to draw in electrolyte 109.

Paddle 300 provides for direct impact of electrolyte stream 313, which may be for pump assisted agitation. Thus, a high amount of agitation may be provided with such agitation being substantially uniform across surface 320 of cathode 104. A gap 321 between paddle 300 surface adjacent to a workpiece and surface 320 of such workpiece may be approximately 0.2 to 4 mm.

Figure 4:
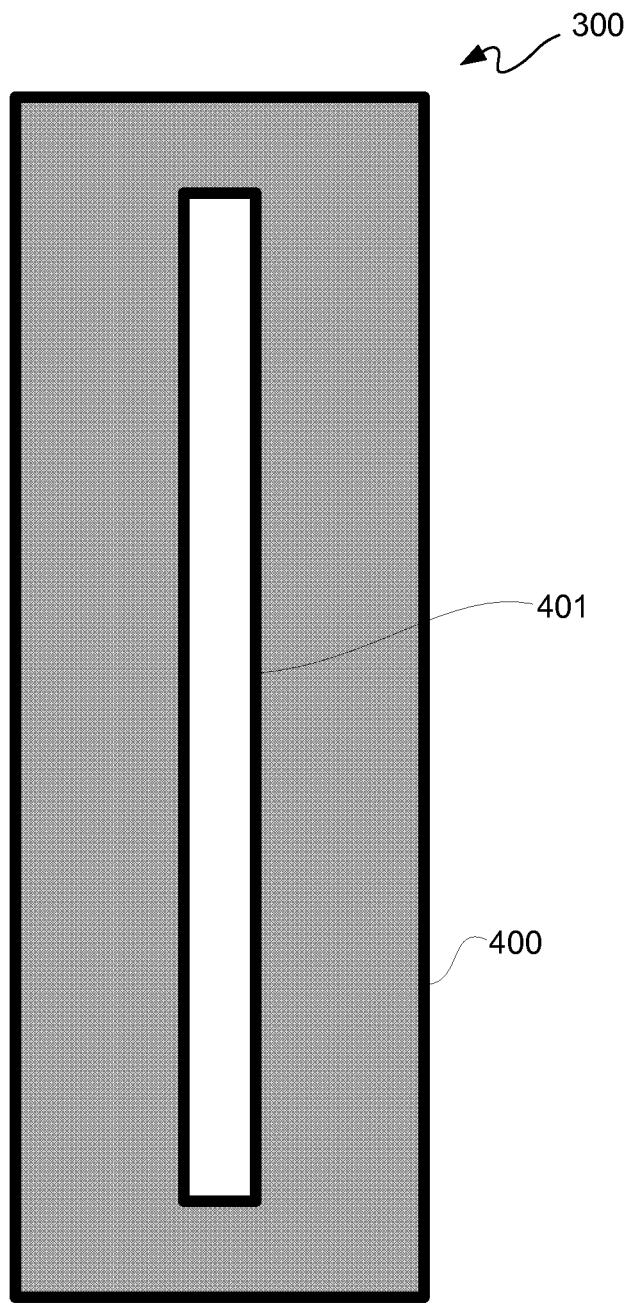
FIG. 4 is a block diagram of a bottom view depicting an exemplary paddle.

FIG. 4 is a block diagram of a bottom view depicting an exemplary paddle 300. Paddle 300 includes a housing of which depicted is a front plate or portion 400. Front plate 400 defines internally thereto a slot 401, which may be orifice 314 of FIG. 3. Electrolyte 109 may be sprayed out of at least one continuously long slot or slit 401 for having a sheet-like stream or spray of electrolyte directly contact a surface of a workpiece, such as a wafer. Rather than a continuously long slit, a plurality of continuous or discontinuous slits may be provided in one or more rows. Furthermore, one or more rows of holes may be used rather than a continuously long slot or slit. Lastly, a combination of slits and holes may be used. Thus, streams and/or sprays out of a paddle 300 as described herein may be a plurality of steams and/or sprays.

Figure 5:
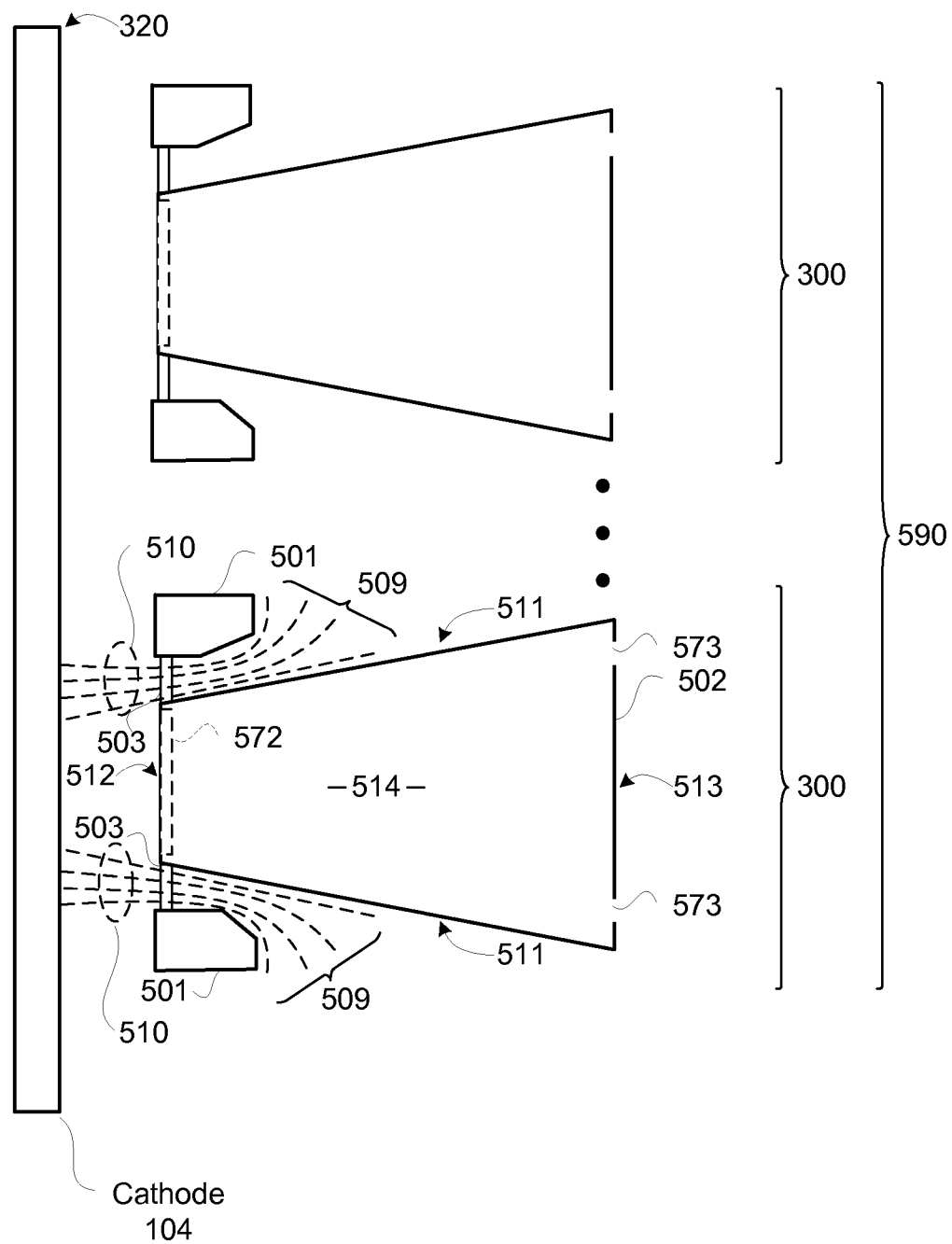
FIG. 5 is a block diagram of a top view depicting another exemplary paddle.

FIG. 5 is a block diagram of a top view depicting another exemplary paddle 300. Paddle 300 may be used in or as part of an electrochemical plating system, such as in a tank 101 of conventional tank plating cell 100 for example.

Paddle 300 includes a structure or housing 502. Structure 502 has a back portion or plate 513 and a front portion or plate 512 spaced apart from one another. Structure 502 has first and second side portions 511 spaced apart from one another. Structure 502 has first and second end portions 514 spaced apart from one another.

A first fin 501, which may be disposed laterally along an external surface, of a first side portion 511 is used to provide a first passageway 509. Such first fin 501 may be offset and coupled, such as with a spacer 503 attached to both and in between such first side portion 511 and such first fin 501, to housing 502. Such first fin 501 may be disposed to define a first passageway 509 between an external surface of such first side portion 511 and an internal surface of such first fin 501 for flow of electrolyte 109 through such first passageway 509.

A second fin 501, which may be disposed laterally along an external surface, of a second side portion 511 is used to provide a second passageway 509. Such second fin 501 may be offset and coupled, such as with a spacer 503 attached to both and in between such second side portion 511 and such second fin 501, to structure 502. Such second fin 501 may be disposed to define a second passageway 509 between an external surface of such second side portion 511 and an internal surface of such second fin 501 for flow of electrolyte 109 through such second passageway 509.

In an implementation, first and second fins 501 for first and second passageways 509 and/or corresponding opposing surfaces as between first and second fins 501 and side portions 511 may each have a shape to enhance the flow of fluid or electrolyte through each slit or aperture respectively between first and second fins 501 and surface 511 and emanating as fluid flux 510. Lateral motion of paddle 300 may further promote flow of fluid flux 510. The faster the motion of paddle 300, the faster may be the velocity of fluid streaming from passageways 509 for splashing or impinging on the surface of cathode or workpiece 104. Additionally, lateral motion of paddle 300 across workpiece 104 may promote Venturi effects further enhancing fluid flow through passageways 509. The higher the velocity of fluid impingement and shear rate on surface 320, the higher the mass transport of such surface. As a consequence, materials may be coated on workpiece 104 at a higher deposition rate. For example, back portion 513 may be wider than front portion 512 to provide a horn-like side profile for each of first and second end portions 514. Moreover, external surface surfaces of side portions 511 may each be curvilinear surfaces with an inwardly directed contour with respect to structure 502 from a back portion 513 narrowed toward front portion 512. Such Venturi effect generated streams 510 may be output from passageways 509 and may impinge upon surface 320.

In some implementations, optionally a surface along front portion 513 of paddle 300 may include or be a counter electrode, such as a cell anode 572. For such cell anode 572 interior to housing 502, openings 573 may be positioned along back portion 513 to allow a resistive electrolytic solution to come into contact with anode 572. For a surface of anode 572 exterior to housing 502, openings 573 may or may not be present, as such housing exterior surface of anode 572 may be in contact with an electrolytic solution. A power source may be coupled to anode 572. Along those lines, power supply 110 may be coupled to anode 572, though such coupling is not shown for purposes of clarity and not limitation. Power supply 110 may provide a first supply voltage to anode 102 and a second supply voltage to anode 572, and these voltages may be substantially different from one another. A closer proximity between a workpiece 104 or workpiece electrode surface 320 and a counter electrode, such as anode 572, on a face of front portion 512 of paddle 300 may significantly reduce voltage used for an electrochemical process or processes. This close proximity may result in less of a potential difference being used for such electrochemical process or processes, and such reduction in voltage may translate to less power consumption and thus less heat dissipation into an electrolyte in a tank or other container of an electrochemical processing system. In other words, use of anode 572 without using anode 102 may be for lower temperature plating or other electrochemical processing operations than used for operations that employ anode 102 without employing anode 572. Along those lines, for an electrochemical processing operation, anode 102 may be on while anode 572 is off; or anode 102 may be off while anode 572 is on; or both anodes 102 and 572 may be on. Additionally, anode 102 is a stationary anode, while anode 572 moves with movement of paddle 300.

In an implementation, an array 590 of paddles 300, of an electrochemical processing system, may be attached to a stiff member and commonly translated back and forth across workpiece surface 320. A relative displacement of such arrays may vary between approximately 1 to 40 cm or more. In an implementation, a shaped paddle array, such as with a shaped surface of side portions 511, may just oscillate. Displacement during such oscillation may vary in between approximately 0.2 to 10 cm. The speed of a paddle 300, or an array 590 of paddles 300, may vary approximately between 5 to 150 cm/s. The acceleration and the deceleration of a paddle 300 may range approximately between 5 to 20 times the speed or velocity of such paddle. In some implementations, an electrochemical cell may contain multiple arrays 590 of paddles 300. Array 590 may include at least one anode 572.

Figure 6:
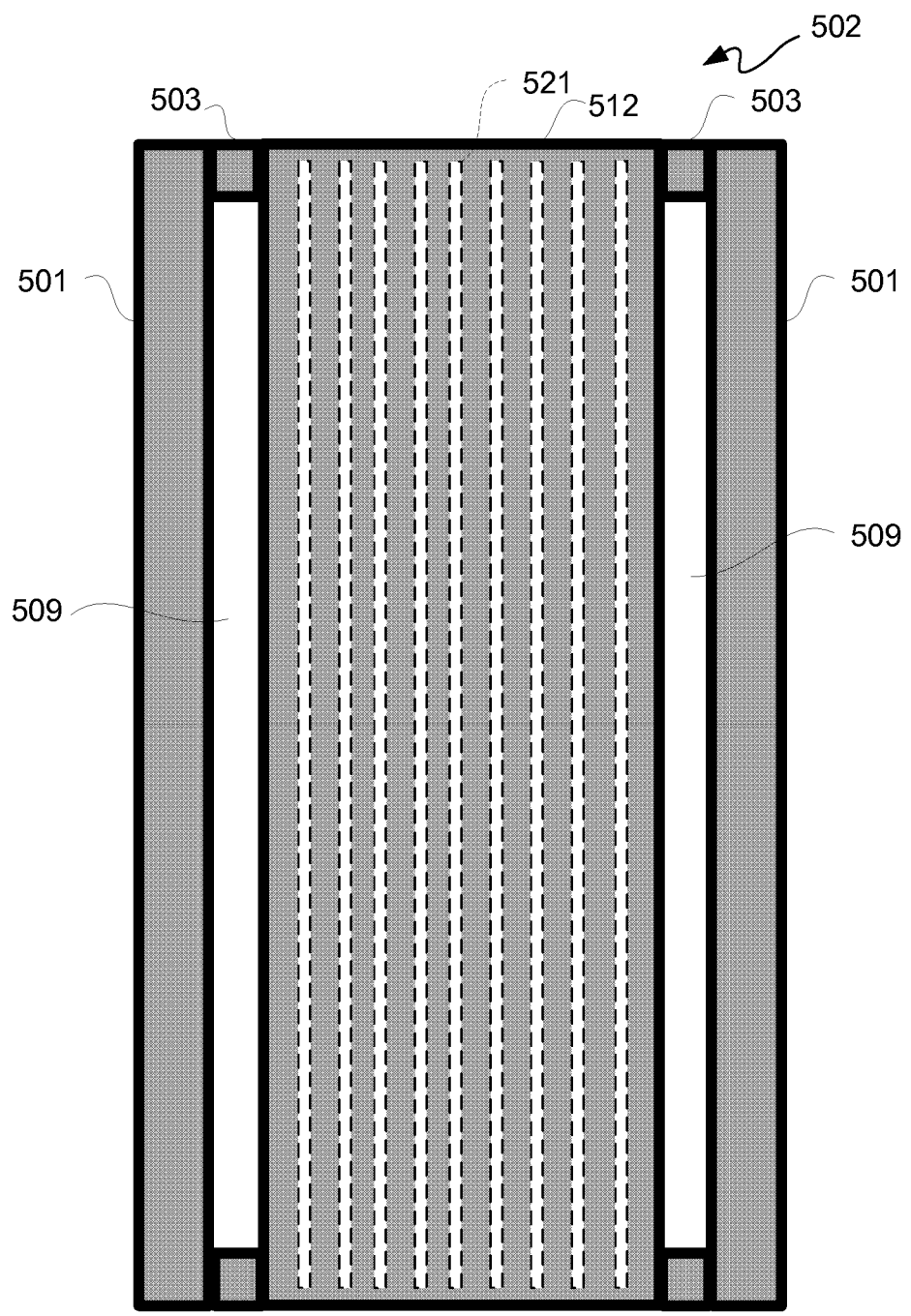
FIG. 6 is a block diagram of a bottom view depicting an exemplary front portion of a housing of the paddle of FIG. 5.

FIG. 6 is a block diagram of a bottom view depicting an exemplary front portion 512 of a housing 502 of a paddle 300 of FIG. 5. Paddle 300 includes a housing 502 for which depicted is a front plate or portion 512 and right and left side fins 501. Front portion 512 is coupled to fins 501 via spacers 503 to define internally thereto two parallel slot-like passageways 509 spaced apart from one another. Optionally, recessed channels or raised elements 521 may be formed in an exterior surface of front portion 512 to promote agitation of electrolyte 109 during a plating operation. Recessed channels or raised elements 521 may generally be parallel with passageways 509. In some implementations, recessed channels or raised elements 521 may not be parallel with passageways 509, namely they may be slanted and disposed at angles varying between approximately 1 to 89 degrees with respect to passageways 509. In an implementation, recessed channels or raised elements 521 may be disposed at 45 degrees with respect to passageways 509. In some implementations, housing 502 may contains more than 2 passageways 509. In some implementations, a counter electrode, such as anode 572, may be disposed behind front portion 512 interior to housing 502. As a result for example, front portion 512 may be disposed between two electrodes, such as cathode 104 and anode 572, with opposing polarities. During an electroprocessing operation in a cell, electrolyte 109 and an electric field (not shown) may communication between workpiece surface 320 and a counter electrode, such as anode 572 for example, via channels 521.

Figure 7:
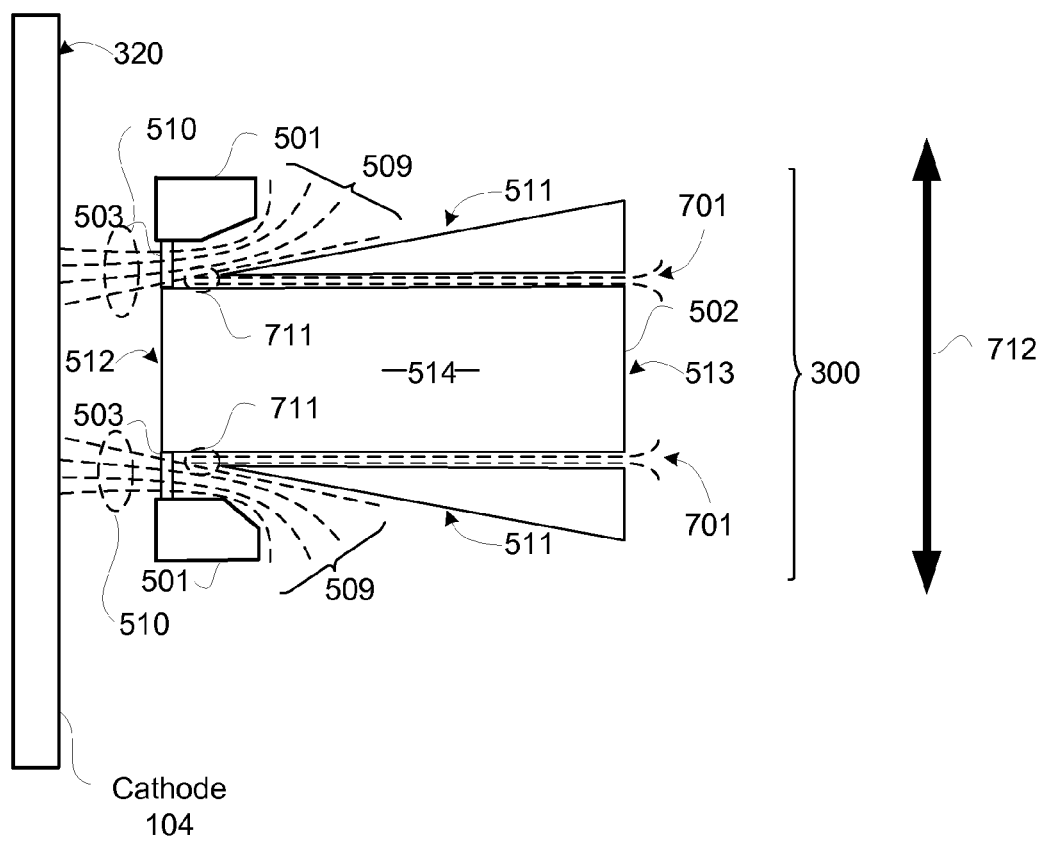
FIG. 7 is a block diagram of a side view depicting another exemplary paddle.

FIG. 7 is a block diagram of a top view depicting another exemplary paddle 300. Paddle 300 may be used in or as part of an electrochemical processing system, such as in a tank 101 of conventional tank plating cell 100 for example. An electrochemical processing system may be used for plating or another activity.

Paddle 300 includes a housing or structure 502. Housing 502 has a back portion or plate 513 and a front portion or plate 512 spaced apart from one another. Housing 502 has a first and second side portions 511 spaced apart from one another. Housing 502 has first and second end portions 514 spaced apart from one another.

A first fin 501, which may be disposed laterally along an external surface, of a first side portion 511 may be used to provide a first passageway 509. Such first fin 501 may be offset and coupled, such as with a spacer 503 attached to both and in between such first side portion 511 and such first fin 501, to housing 502. Such first fin 501 may be disposed to define a first passageway 509 between an external surface of such first side portion 511 and an internal surface of such first fin 501 for flow of electrolyte 109 through such first passageway 509.

A second fin 501, which may be disposed laterally along an external surface, of a second side portion 511 to define a second passageway 509. Such second fin 501 may be offset and coupled, such as with a spacer 503 attached to both and in between such second side portion 511 and such second fin 501, to housing 502. Such second fin 501 may be disposed to define a second passageway 509 between an external surface of such second side portion 511 and an internal surface of such second fin 501 for flow of electrolyte 109 through such second passageway 509.

In an implementation, first and second fins 501 for first and second passageways 509 and/or corresponding opposing surfaces as between first and second fins 501 and side portions 511 may each have a shape to promote respective Venturi effects. For example, back portion 513 may be wider than front portion 512 to provide a horn-like side profile for each of first and second end portions 514. Moreover, external surface surfaces of side portions 511 may each be curvilinear surfaces with an inwardly directed contour with respect to housing 502 from a back portion 513 narrowed toward front portion 512. Such Venturi effect generated streams 510 may be output from passageways 509 and may impinge upon surface 320.

In some implementations, paddle 300 may be rotated 180 degrees with respect to surface 320 of workpiece 104. In this configuration, back portion 513 of paddle 300 is proximal, and may be directly facing, to surface 320 of workpiece 104. During an electro-chemical operation using motion of such a reversed paddle 300, motion of what is now a the back surface or portion 512 of housing 502 may induce a "sharing" action of surface 320 of workpiece 104, as electrolytes on surface 320 of workpiece 104 may be pulled or sucked into channels 701 by Venturi effects generated streams 510, which may be output from passageways 509.

Additionally, paddle 300 may have channels 701, each of which may have an inflow opening along back portion 513 and an outflow opening proximate to or defined by a front portion 512, where the latter of such openings correspond to passageways 509. Such inflow opening may be to receive inflow of an electrolyte 109 in a tank 101 of an electrochemical processing system, such as tank plating cell 100 for example. Flows of electrolyte 109 from back to front portions of housing 502 is through channels 701 is promoted by Venturi effects provided by configuration of passageways 509, where ingress openings of passageways 509 are wider than egress openings of passageways of 509. Thus, a confluence of flows through channels 701 and passageways 509 may be used to provide streams 510.

To recapitulate, a first fin 501 is for a first passageway 509 and a second fin 501 is for a second passageway 509, each fin 501, and thus each passageway, has a shape to provide a first Venturi effect and a second Venturi effect, respectively, to provide streams 510. First openings along back portion 513 and second openings of front portion 512 are for a first channel 701 and a second channel 701, respectively, intersecting a first passageway 509 and a second passageway 509 to provide a first confluence region 711 and a second confluence region 711 for flow of electrolyte 109 respectively through such first passageway 509 and such second passageway 509. Channels 701 may extend through or be partially part of an interior hollow region of housing 502. Such first confluence region 711 and such second confluence region 711 respectively in combination with such first passageway 509 and such second passageway 509 are configured to promote a first Venturi effect and a second Venturi effect, respectively. Paddle 300 is for operation with a vertical orientation in a tank 101 of an electrochemical plating system for movement to and fro across workpiece 104, as generally indicated by arrow 712. As paddle 300 is moved or sweeps from left to right 712, a pumping action or flow rate generated in passageways 509 of electrolyte 109 draws electrolyte 109 into first and second channels 701 to increase the amount of volume of electrolyte 109 delivered as steams 510, which may be sheet-like sprays. Additionally, a cover plate or back plate spaced apart from back portion 513 may be attached to housing 502 to promote mixing of electrolyte 109, as described below in additional detail. In some implementations, an electro-processing cell may contain multiple paddles 300. In some implementations, paddle 300 may contain one or more channels (not shown) between surfaces 511. Use of a channel may advantageously reduce the incidence of a standing wave or waves at high paddle velocities on surface 320 of a workpiece 104.

Figure 8:
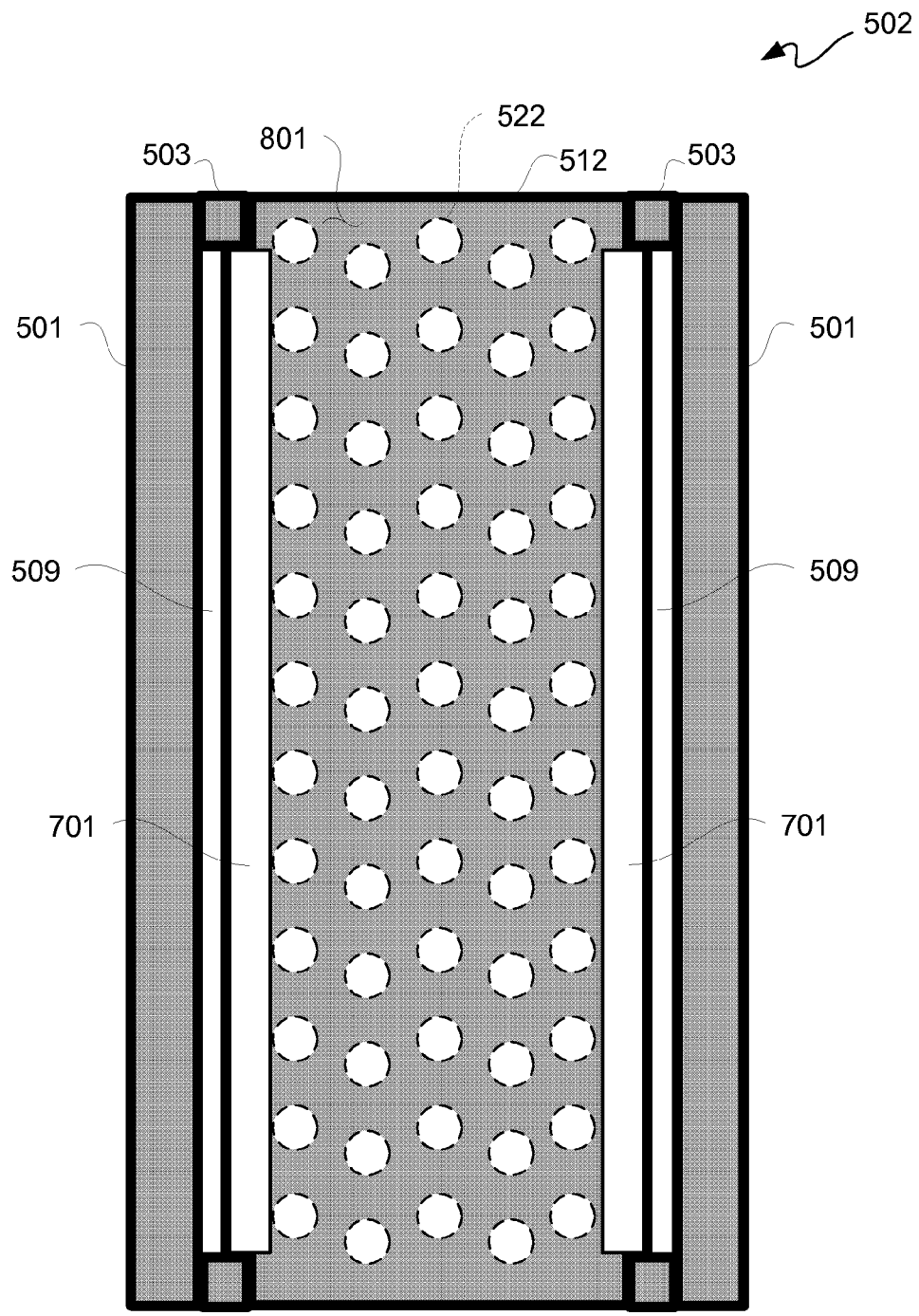
FIG. 8 is a block diagram of a bottom view depicting an exemplary front portion of a housing of the paddle of FIG. 7.

FIG. 8 is a block diagram of a bottom view depicting an exemplary front portion 512 of a housing 502 of a paddle 300 of FIG. 7. Optionally, raised bumps 522 may be formed on an exterior surface 801 of front portion 512 to promote agitation of electrolyte 109 during a plating operation. Raised bumps 522 may be generally provided in rows which are parallel with channels 701 and passageways 509; however, in contrast, raised bumps 522 do not provide orifices into a hollow or interior region of housing 502. With respect to FIG. 6, an external surface of front portion 512 may have at least one of raised bumps 522 and/or recesses 521 to promote agitation of an electrolyte 109. In some implementations, channels may be disposed on a surface of front portion 512 for the communication of electrolyte 109 and an electric field (not shown) through such channels between workpiece 104 and a counter electrode 572, as previously described.

Figure 9:
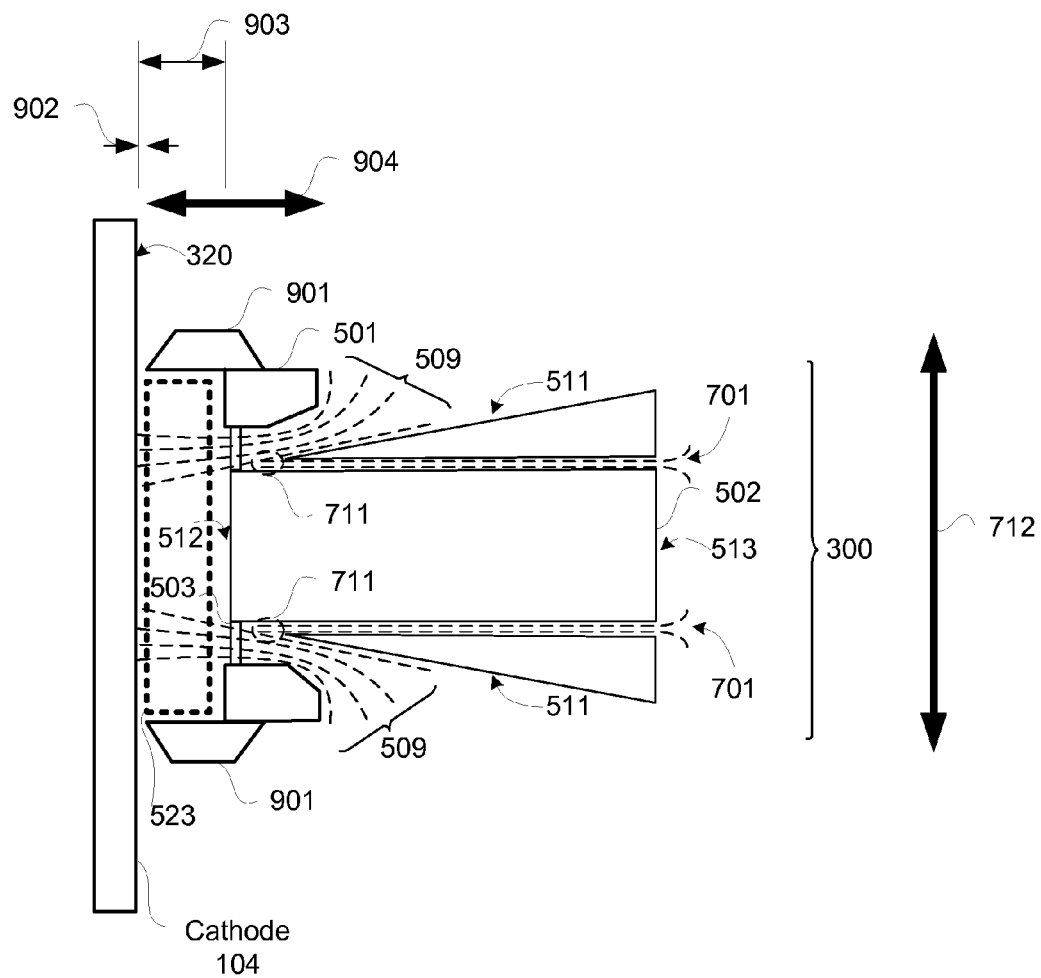
FIG. 9 is a block diagram of a side view depicting yet another exemplary paddle.

FIG. 9 is a block diagram of a side view depicting yet another exemplary paddle 300. Paddle 300 may be used in or as part of an electrochemical processing system, such as in a tank 101 of conventional tank plating cell 100 for example. Paddle 300 is the same as paddle 300 of FIG. 7, except with the addition of blades 901.

Blades 901 may be respectively attached to fins 501. Blades 901 may be attached to outer external surfaces of fins 501. Distal ends of blades 901 may be closer to surface 320, as generally indicated by gap 902, than distal ends of fins 501, as generally indicated by gap 903. Blades 901 may be adjustable in a horizontal direction, as generally indicated by arrow 904, to be closer or further from surface 320. Gap 902 may be less than approximately 1 mm, and gap 903 may be approximately 1 to 4 mm. Blades 901 may be used build-up the amount of pressure between surface 320 and front portion 512 for depositing a plating layer. Such additional pressure may be useful to help thin down a liquid boundary layer on a plating liquid, which may provide additional agitation at a plating layer interface. This additional pressure may accordingly provide for increased penetration or diffusion of plating material into voids or interstices along a surface 320 of a workpiece. As paddle 300 moves left to right, a pressure pulsing-effect, like a rolling pin, moves across surface 320. Thus, a net build-up of a plating layer on a surface 320 may be thinner. Along those lines, blades 901 optionally may be attached to first and second end portions 514 to surround, whether staggered with gaps between blades or continuous, a region 523 between surface 320 and front portion 512 for depositing a plating layer. In some implementations, a paddle 300 or a cell 100 may contain more than 2 blades or knife edges 901.

Figure 10:
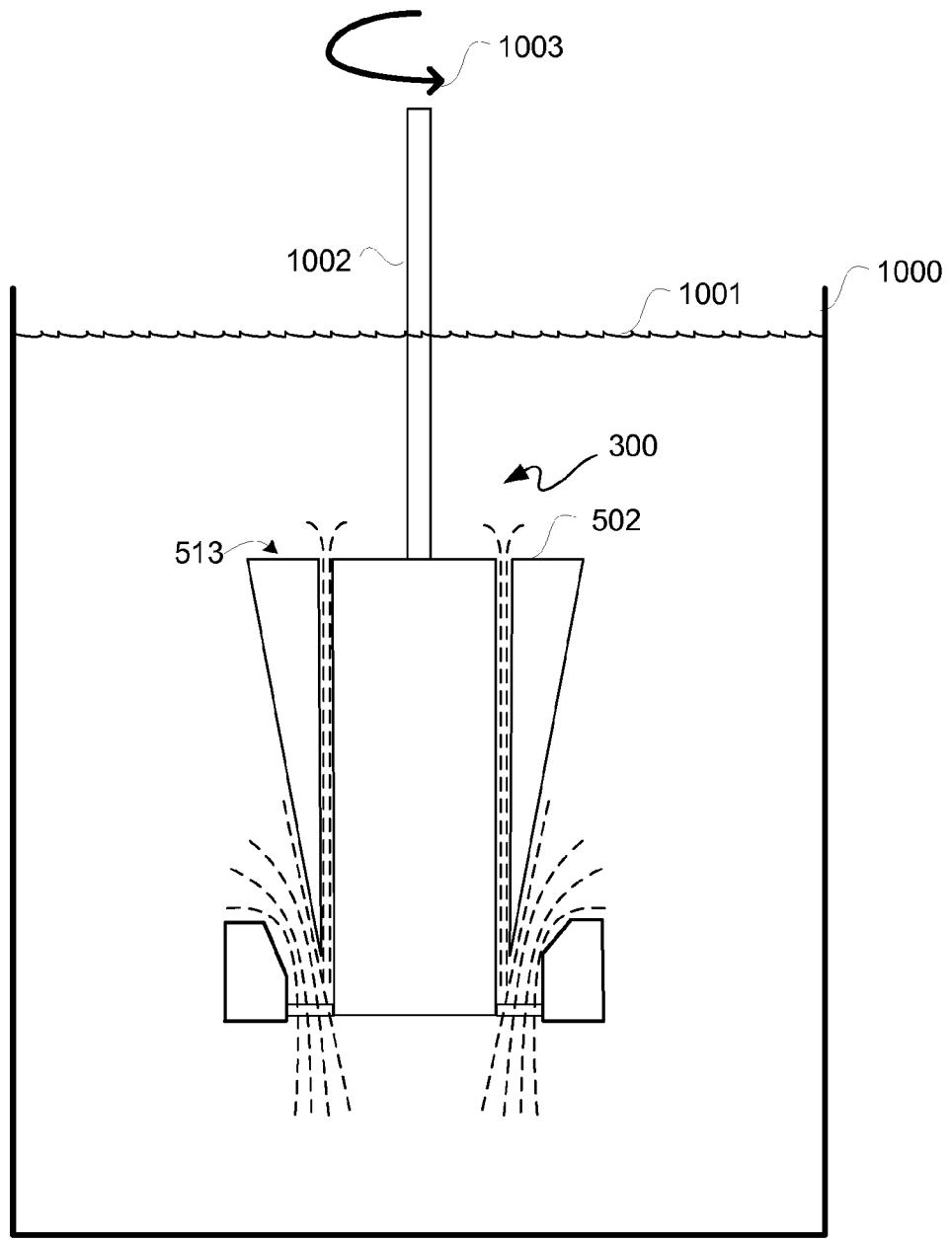
FIG. 10 is the block diagram of a side view depicting the exemplary paddle of FIG. 7 with a vertical orientation.

FIG. 10 is the block diagram of a side view depicting the exemplary paddle 300 of FIG. 7 with a vertical orientation. A shaft 1002 may be attached to a back portion 513 of housing 502. Shaft 1002 may have a vertical orientation for rotating paddle 300, as generally indicated by arrow 1003. Paddle 300 may be rotated in a container 1000, such as a tank or bucket, having a liquid 1001 for purposes of stirring such liquid. For large tanks, paddle 300 may additionally be translated back and forth while rotating. In some implementations, impellers (not shown) may be attached to surface 511 to further enhance mass transport during the various motions of paddle 300 in container 1000.

Figure 11:
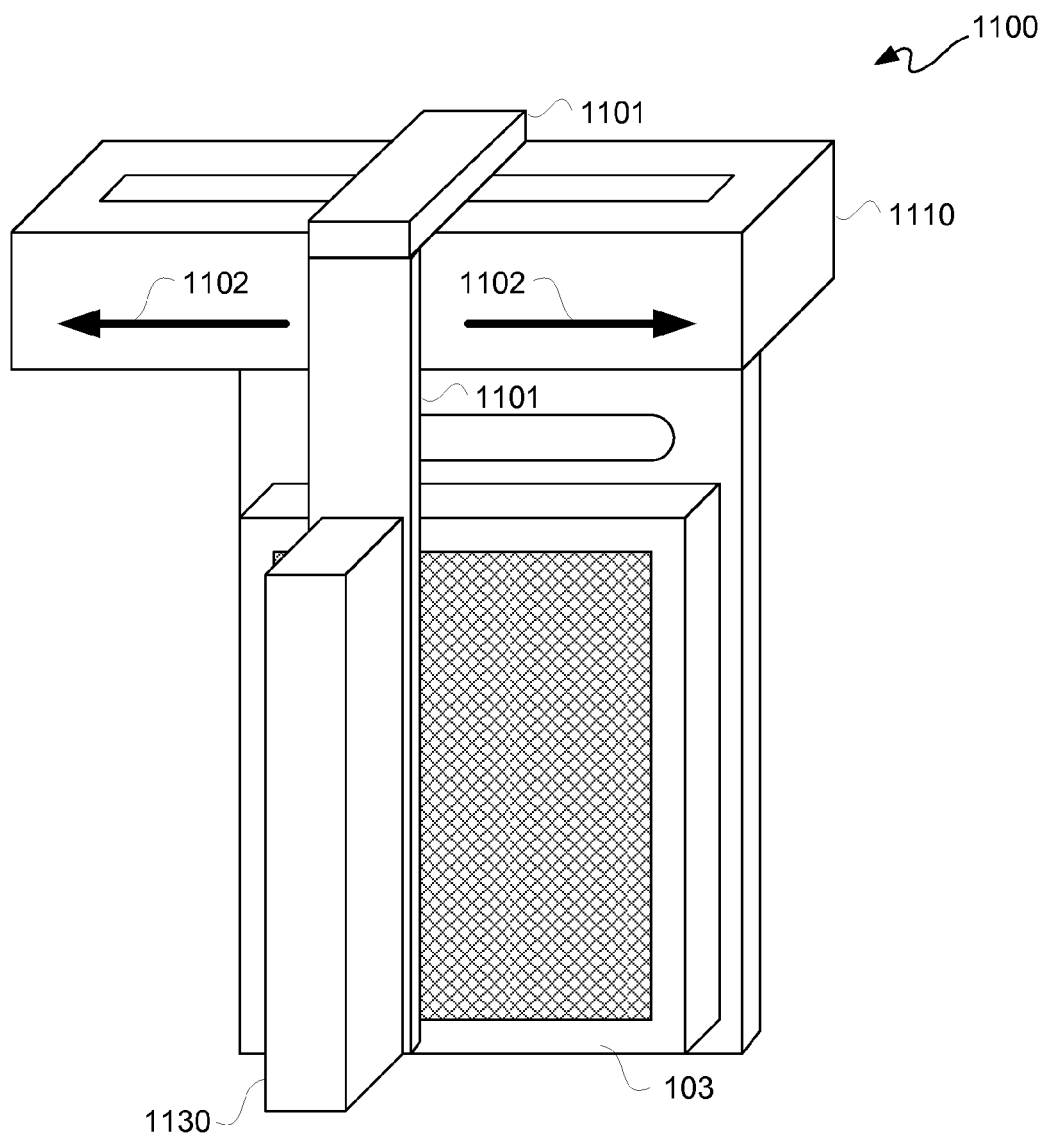
FIG. 11 is a block diagram of a front-facing perspective view depicting an exemplary vertical paddle plating actuator system.

FIG. 11 is a block diagram of a front-facing perspective view depicting an exemplary vertical paddle plating actuator system 1100. Any of paddles 300 described herein, as generally indicated by block 1130, may be attached to an arm 1101 of vertical paddle plating actuator system 1100. Arm 1101 may be spaced away from an anode chamber 103, and a portion of arm 1101 may be attached to a linear actuator-motor subassembly 1110 for moving arm 1101 linearly right and left, as generally indicated by arrows 1102. In one implementation, block 1130 may include an electrode, such as anode or counter electrode. For example block 1130 may incorporate anode 572 of FIG. 5, where such anode 572 is configured as anode 102, namely as a filter/ disperser 103. Along those lines, vertical paddle plating actuator system 1100 may omit a stationary anode 102 in favor of such an anode 572. In another implementation, more than one anode or electrode so configured as such an anode 572 may be included in or with block 1130. In another configuration, anode 102 of filter/disperser 103 may be present as a first or stationary anode or electrode, and block 1130 may include one or more anodes or electrodes 572 of a same polarity as anode 102 in vertical paddle plating actuator system 1100. Anodes 572 and 102 may be formed of same or different materials. For example, anode 102 may generally consist of a pure metal, such as copper, nickel, or the like, and one or more anodes 572 of block 1130 may generally consist of an alloy composed of such a pure metal used in anode 102.

Figure 12:
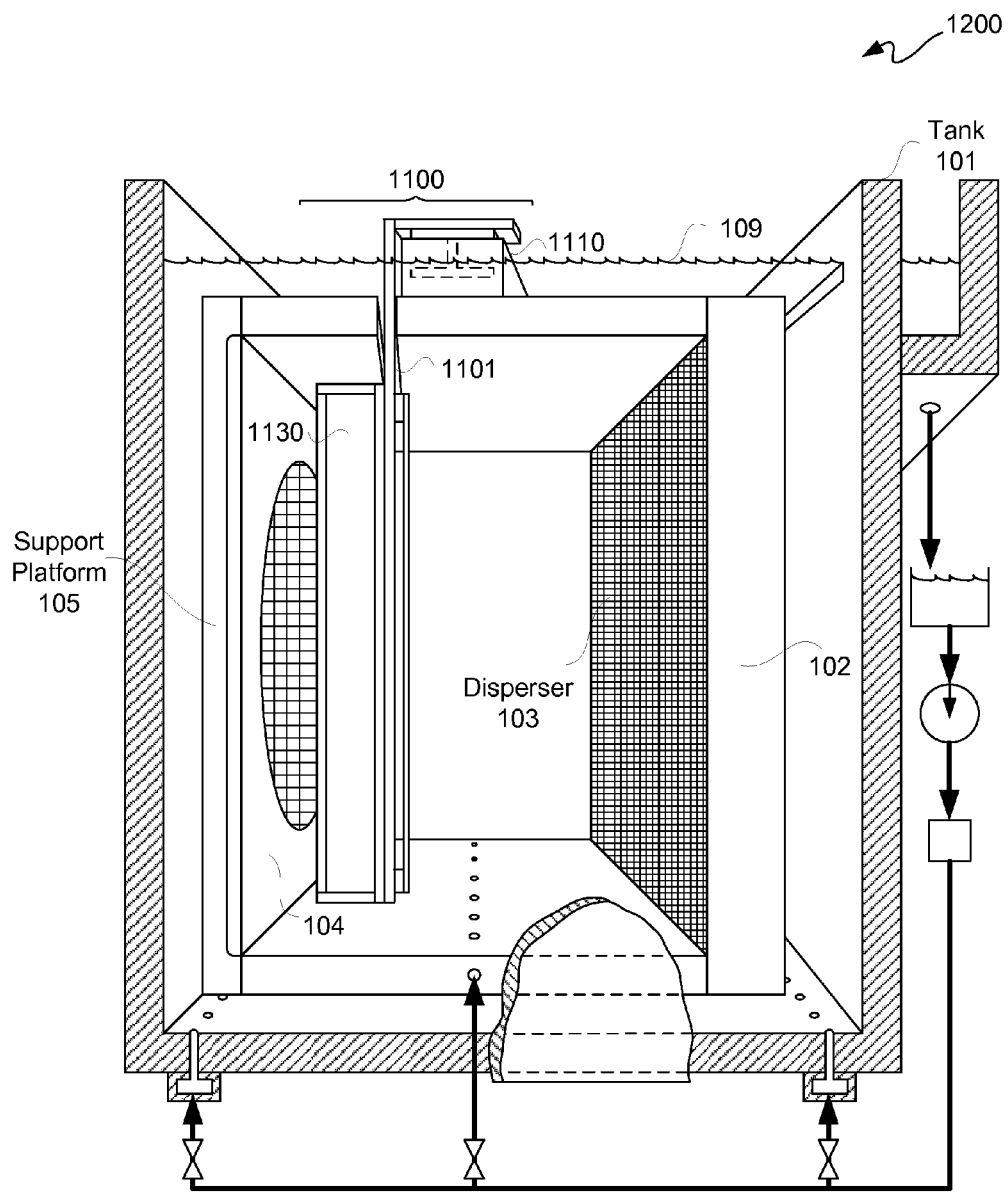
FIG. 12 is a block diagram of a front-facing cutaway perspective view depicting an exemplary vertical paddle plating system, such as for the paddle of FIGS. 5 and 7.

FIG. 12 is a block diagram of a front-facing cutaway perspective view depicting an exemplary vertical paddle plating system 1200. Vertical paddle plating system 1200 may include any of paddles 300 described herein, as generally indicated by block 1130, attached to an arm 1101 of a vertical paddle plating actuator system 1100. A slot of a linear actuator-motor subassembly 1110 may be located above a surface of an electrolyte 109 in tank 101.

A wafer may be located on a cathode 104, which is on a support platform 105. Submerged in electrolyte 109 may be an anode 102, as well as filter/disperser 103. Some additional known details regarding vertical paddle plating system 1200 are not described for purposes of clarity and not limitation.

Figure 13:
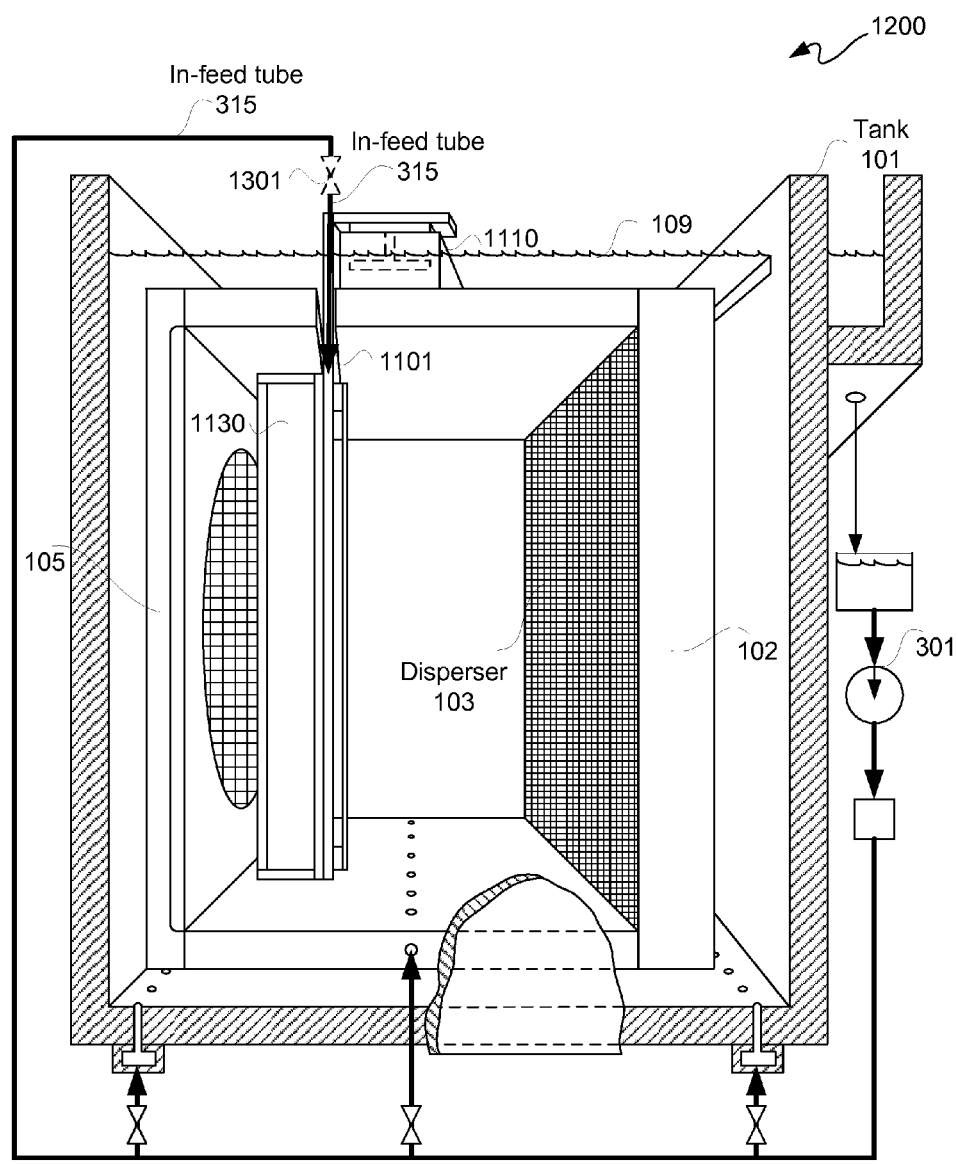
FIG. 13 is the block diagram of a front-facing cutaway perspective view depicting the exemplary vertical paddle plating system of FIG. 12 for the paddle of FIG. 3.

FIG. 13 is the block diagram of a front-facing cutaway perspective view depicting an exemplary vertical paddle plating system 1200, except block 1130 is for paddle 300 of FIG. 3. Along those lines, an in-feed tube 315 may be directly coupled to a housing 502 of paddle 300, which may optionally be through a valve 1301. Electrolyte 109 may be pumped from tank 101 by pump 301, and such electrolyte 109 may be pumped by pump 301 into in-feed tube 315 into an interior hollow region of paddle 300. In this configuration of paddle 300, such paddle 300 may have a port opening, such as at an upper end portion 514, for coupling of an outlet end of in-feed tube 315 for electrolyte to flow out one or more slots 401 of paddle 300. In another configuration that does not use an in-feed tube 315, but rather relies on a Venturi effect, such paddle 300 may have an opening generally at a back portion 513 for flow of electrolyte 109 into an interior hollow region of a housing of such a paddle 300 for flow out of one or more slots 401 of such paddle 300, as described in additional detail with reference to FIG. 14.

Figure 14:
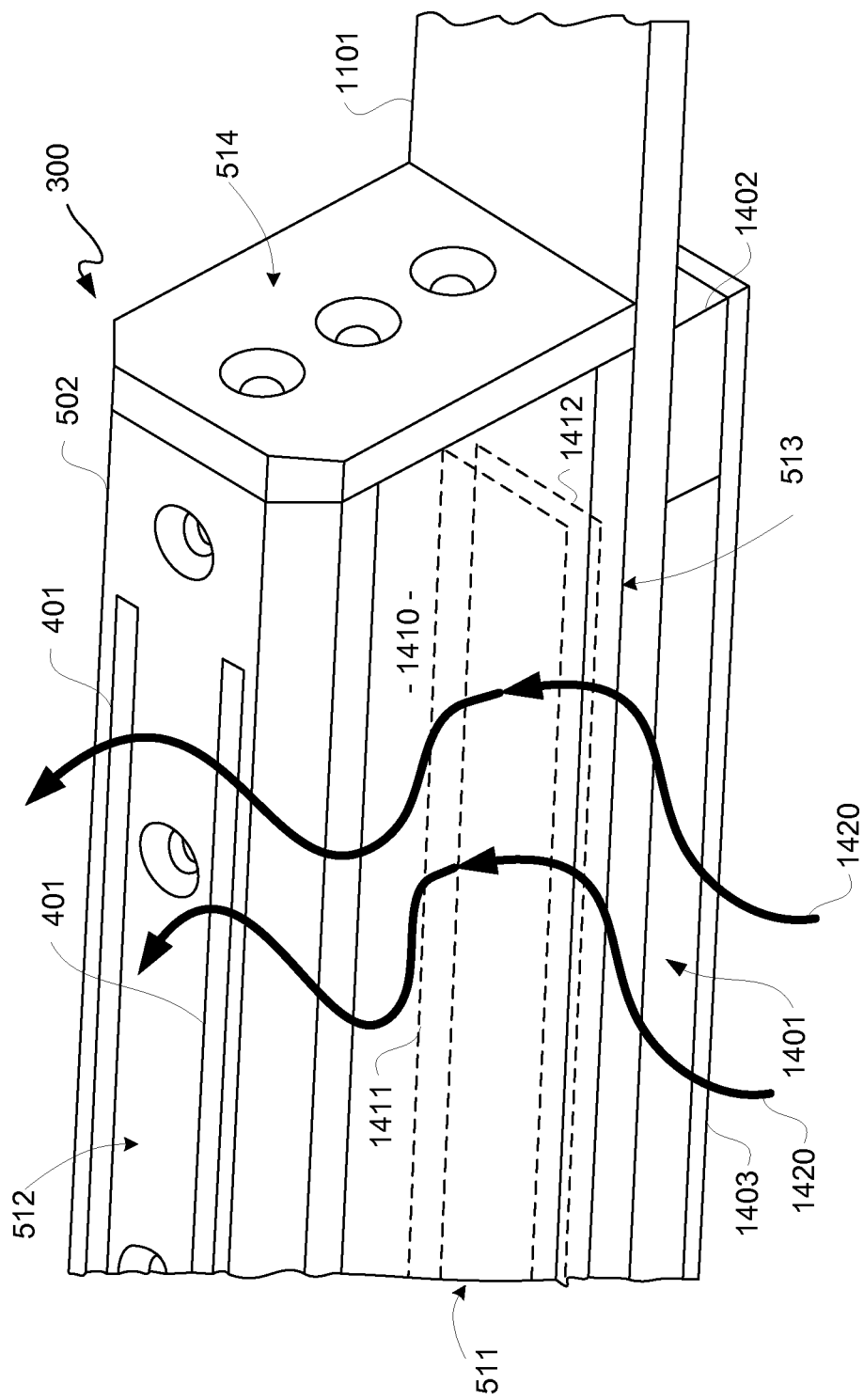
FIG. 14 is a perspective view depicting an exemplary vertical paddle, such as of FIG. 3, coupled to an arm.

FIG. 14 is a perspective view depicting an exemplary vertical paddle 300, such as of FIG. 3, coupled to an arm 1101. Paddle 300 includes front portion 512, which in this example is a front plate, a back portion 513, which in this example is a back plate which is attached to arm 1101. First and second side portions 511 (only a near portion of which is illustratively depicted) are respective side plates, and first and second end portions 514 (only a right portion of which is illustratively depicted) are respective end plates. In some implementations, some portions of front portion 512 may be adapted as a counter electrode. For example, in electroetching or electropolishing of a workpiece 104, such workpiece 104 may be rendered anodic and front portion 512 of paddle 300 may be rendered cathodic.

Back portion 513, front portion 512, first and second side portions 511, and first and second end portions 514 define an interior hollow region 1410 of housing 502. Arm 1101 and back portion 513 may respectively have openings 1412 and 1411 for the flow of electrolyte across surfaces of side portions 511 to reduce incidence of a standing wave on surface 320 of workpiece 104 during a high velocity of paddle 300 plating process.

In some implementations, an anode or anodic material may be incorporated in an interior hollow region 1410 of housing 502. Optionally, on a side of arm 1101 opposite to the side on which paddle 300 is attached may be spacers 1402 (only one of which is illustratively depicted in this FIG.) to support a cover plate 1403. Accordingly, an inlet gap 1401 may be provided for flow of electrolyte 109 into inlet gap 1401 through openings 1412 and 1411 into interior hollow region 1410 of housing 502 and out of interior hollow region 1410 of housing 502 via one or more slots 401 in front portion 512, as generally indicated by arrows 1420. Additionally, cover plate 1403 provides for additional mixing of electrolyte 109 in a tank when paddle 300 is moved. Cover plate 1403 and slots or channels 1401 may serve to enhance mass transport at an anode which is proximate to cover plate 1403. Even though only a single cover plate 1403 is illustratively depicted, a stack of cover plates and associated flow-ways may be included.

Figure 15:
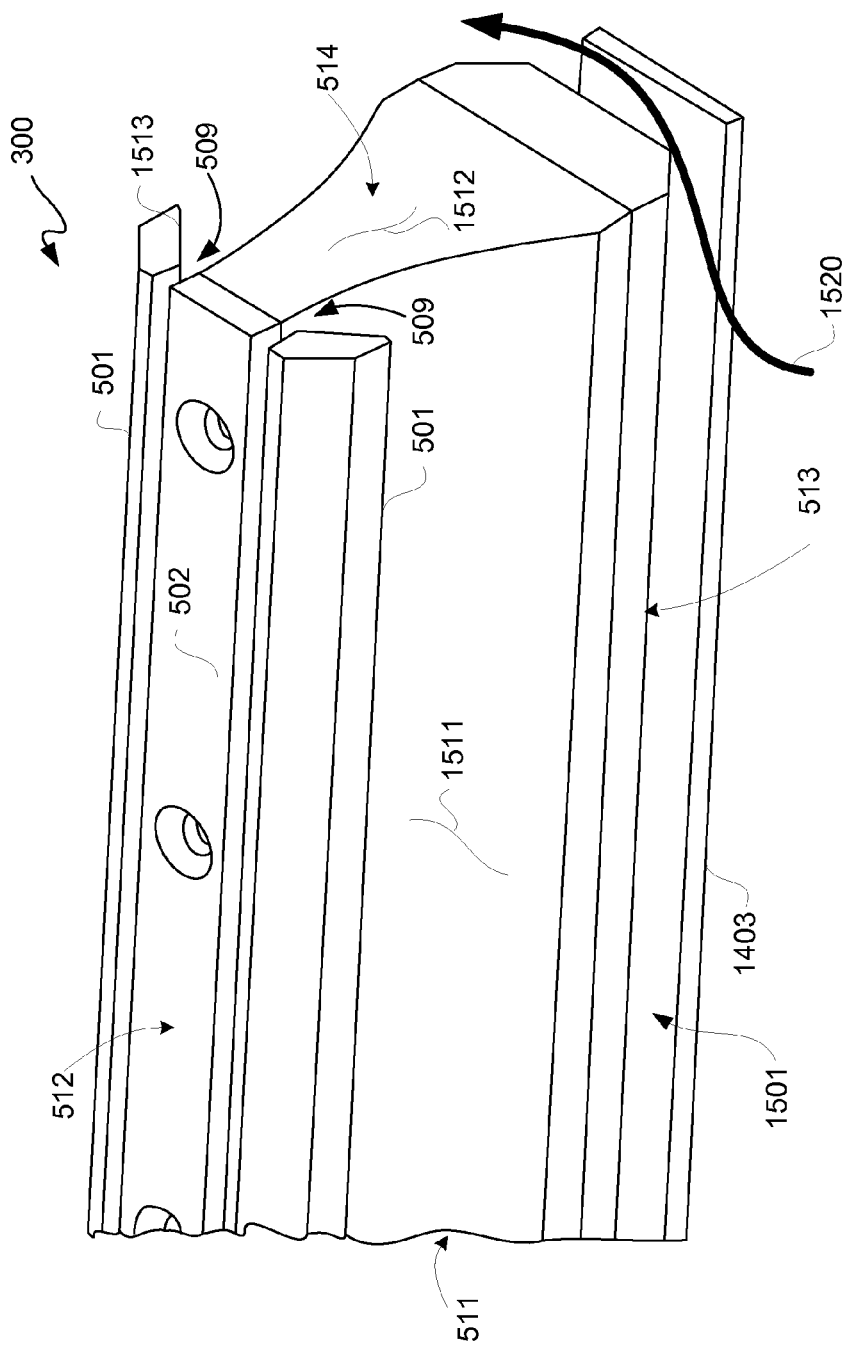
FIG. 15 is a perspective view depicting an exemplary vertical paddle, such as of FIG. 5.

FIG. 15 is a perspective view depicting an exemplary paddle 300, such as of FIG. 5. This paddle 300 may be coupled to an arm 1101 (shown in FIG. 14 for example). This exemplary paddle 300 may be disposed vertically when a workpiece is disposed vertically, or may be disposed horizontally when a workpiece is disposed horizontally. In general, a space between a workpiece surface 320 and a facing surface or other proximate feature of paddle 300 may be less than 5 mm, and in some instances less than 1 mm, including without limitation when anode 572 is present. Workpiece surface 320 and front portion 512 of paddle 300 may be at least substantially parallel, if not exactly parallel, to one another, regardless of either's orientation to a counter electrode, such as anode 572. In some implementations, workpiece 104 may rotate with respect to the motion of paddle 300. In some applications, both workpiece 104 and paddle 300 may rotate during an electroprocessing operation.

Paddle 300 includes front portion 512, which in this example is a front plate, a back portion 513, which in this example is a back plate which is attached to arm 1101. First and second side portions 511 (only a near portion of which is illustratively depicted) are respective side plates, and first and second end portions 514 (only a right portion of which is illustratively depicted) are respective end plates. Back portion 513, front portion 512, first and second side portions 511, and first and second end portions 514 are of a housing 502. Optionally, spacers (not illustratively depicted in this FIG.) may be attached to back portion 513 to support a cover plate 1403. Accordingly, a pass-through gap 1501 may be provided for flow of electrolyte 109 through such, as generally indicated by arrow 1520.

First and second side portions 511 may have a curvilinear contour 1511, such as previously described to promote a Venturi effect through passageways 509. First and second end portions 514 may have a curvilinear contour 1512 like that of curvilinear contour 1511 to promote flow of electrolyte 109. Additionally, fins 501 may have inwardly beveled surfaces 1513 to promote flow of electrolyte 109 into passageways 509 to promote Venturi effects. Curvilinear contours 1512 provide a substantial amount of surface area, as well as shapes, to direct electrolyte 109 to flow into passageways 509 when paddle 300 is moved, such as up and down, with pressure build-up caused by Venturi effects. As paddle 300 is moved up and down, currents into passageways 509 are generated in a tank of electrolyte 109, where speed of such currents is proportional to the speed at which paddle 300 is moved. Thus, a sufficient amount of force of a sheet-like spray or stream of electrolyte 109 may impact a surface of a workpiece without having to pump electrolyte 109 into a housing of paddle. In other words, a "pumpless" paddle tank cell may be provided with respect to deposition of a material onto a workpiece.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A paddle for an electrochemical processing system, comprising:
   a housing;
   wherein the housing has a back portion and a front portion spaced apart from one another;
   wherein the housing has a first side portion and a second side portion spaced apart from one another;
   wherein the housing has a first end portion and a second end portion spaced apart from one another;
   a first fin disposed laterally along a first external surface of the first side portion and offset and coupled to the first external surface to define a first passageway between the first external surface of the first side portion and a first internal surface of the first fin for flow of an electrolyte through the first passageway;
   a second fin disposed laterally along a second external surface of the second side portion and offset and coupled to the second external surface to define a second passageway between the second external surface of the second side portion and a second internal surface of the second fin for flow of the electrolyte through the second passageway;
   ingress openings of the first passageway and the second passageway being wider than egress openings of the first passageway and the second passageway, respectively; and
   the egress openings of the first passage way and the second passageway being proximate to or defined by the front portion of the housing.

2. The paddle according to claim 1, wherein the first fin for the first passageway and the second fin for the second passageway each have a shape to provide respective Venturi effects.

3. The paddle according to claim 2, wherein:
   the first external surface and the second external surface are each curvilinear surfaces with an inwardly directed contour with respect to the housing from the back portion narrowed toward the front portion; and
   an external surface of the front portion has at least one of raised bumps or recesses to promote agitation of the electrolyte.

4. The paddle according to claim 3, wherein the housing comprises an electrode.

5. In the electrochemical processing system having the paddle according to claim 1, the electrochemical processing system comprises a container having the paddle disposed therein.

6. The electrochemical processing system according to claim 5, wherein the housing comprises an electrode.

7. The electrochemical processing system according to claim 6, wherein the electrode is an anode disposed along the front portion of the housing for facing a workpiece surface.

8. A paddle for an electrochemical processing system, comprising:
   a housing comprising an electrode;
   wherein the housing has a back portion and a front portion spaced apart from one another;
   wherein the back portion has a first opening of a channel through the housing for inflow of an electrolyte;
   wherein the front portion has a second opening of the channel for outflow of the electrolyte;
   wherein the housing has a first side portion and a second side portion spaced apart from one another;
   wherein the housing has a first end portion and a second end portion spaced apart from one another; and
   wherein the back portion, the front portion, the first side portion, the second side portion, the first end portion, and the second end portion define a hollow region of the housing.

9. The paddle according to claim 8, wherein the first opening and the second opening are configured to provide a Venturi effect.

10. In the electrochemical processing system having the paddle according to claim 8, the electrochemical processing system comprises a container having the paddle disposed therein.

11. The electrochemical processing system according to claim 10, wherein the electrode is an anode disposed along the front portion of the housing for facing a workpiece surface.

12. A paddle for an electrochemical processing system, comprising:
    a housing;
    wherein the housing has a back portion and a front portion spaced apart from one another;
    wherein the back portion has a first plurality of openings for inflow of an electrolyte;
    wherein the front portion has a second plurality of openings for outflow of the electrolyte;
    wherein the housing has a first side portion and a second side portion spaced apart from one another;
    wherein the housing has a first end portion and a second end portion spaced apart from one another;
    wherein the back portion, the front portion, the first side portion, the second side portion, the first end portion, and the second end portion define a hollow region of the housing;
    a first fin disposed laterally along a first external surface of the first side portion and offset and coupled to the first external surface to define a first passageway between the first external surface of the first side portion and a first internal surface of the first fin for flow of the electrolyte through the first passageway; and
    a second fin disposed laterally along a second external surface of the second side portion and offset and coupled to the second external surface to define a second passageway between the second external surface of the second side portion and a second internal surface of the second fin for flow of the electrolyte through the second passageway.

13. The paddle according to claim 12, wherein the first fin for the first passageway and the second fin for the second passageway each have a shape to provide a first Venturi effect and a second Venturi effect.

14. The paddle according to claim 13, wherein:
the first plurality of openings of the back portion and the second plurality of openings of the front portion are for a first channel and a second channel respectively intersecting the first passageway and the second passageway to provide a first confluence region and a second confluence region for flow of the electrolyte respectively through the first passageway and the second passageway; and
the first confluence region and the second confluence region respectively in combination with the first passageway and the second passageway are configured to promote the first Venturi effect and the second Venturi effect, respectively.

15. The paddle according to claim 12, wherein the housing comprises an electrode.

16. In the electrochemical processing system having the paddle according to claim 12, the electrochemical processing system comprises:
a container having the paddle disposed therein; and
wherein the housing comprises an anode disposed along the front portion of the housing for opposing a workpiece surface.

17. In the electrochemical processing system having the paddle according to claim 12, the electrochemical processing system comprises an array of paddles including the paddle.

18. The electrochemical processing system according to claim 17, wherein:
the array of paddles includes at least one anode; and
the at least one anode is disposed along the front portion of the housing for facing a workpiece surface.

* * * * *